US012566787B1

(12) United States Patent
Ramesh et al.

(10) Patent No.: US 12,566,787 B1
(45) Date of Patent: Mar. 3, 2026

(54) METHOD AND SYSTEM FOR GENERATIVE ARTIFICIAL INTELLIGENCE (GENAI)-BASED ANALYSIS OF TICKET DATA

(71) Applicant: AT&T Intellectual Property I, L.P., Atlanta, GA (US)

(72) Inventors: Masoor Ramesh, Cumming, GA (US); Kim Haislip, Stone Mountain, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/969,367

(22) Filed: Dec. 5, 2024

(51) Int. Cl.
G06F 16/33 (2025.01)
G06F 16/31 (2019.01)
G06F 16/334 (2025.01)

(52) U.S. Cl.
CPC .......... G06F 16/3344 (2019.01); G06F 16/31 (2019.01)

(58) Field of Classification Search
CPC .............................. G06F 16/3344; G06F 16/31
See application file for complete search history.

(56) References Cited

U.S. PATENT DOCUMENTS

| | | | |
|---|---|---|---|
| 8,260,764 B1 * | 9/2012 | Gruber | G06F 16/2428 707/708 |
| 2013/0179307 A1 * | 7/2013 | Heil | G06Q 10/087 705/28 |
| 2021/0011832 A1 * | 1/2021 | Togawa | G06F 11/3476 |
| 2025/0139110 A1 * | 5/2025 | Shankar | G06F 16/24522 |
| 2025/0173330 A1 * | 5/2025 | Durg | G06F 16/243 |

* cited by examiner

*Primary Examiner* — Loc Tran
(74) *Attorney, Agent, or Firm* — Guntin & Gust, PLC; Andrew Gust

(57) ABSTRACT

Aspects of the subject disclosure may include, for example, receiving a user prompt relating to one or more tickets stored in a database, transmitting the user prompt to an LLM to derive a database access query, after the transmitting, obtaining the database access query from the LLM, sending the database access query to a query service to retrieve ticket-related data from the database, based on the sending, obtaining retrieved ticket-related data from the query service, and causing the LLM to generate a response to the user prompt using the retrieved ticket-related data. Other embodiments are disclosed.

20 Claims, 24 Drawing Sheets

200

| TBLCODEREFERENCE |
| DESCRIPTION |
| CODETYPE |
| CODE (PK) |

FIG. 2F

| TBLNOTE |
| --- |
| NOTEID (PK) |
| TEXT |
| TYPE |
| ADDDATE |
| PERSON |
| OLDWOINDEX (FK) |

FIG. 2K

Prompt: Show me a report of 10 completed tickets in Bob Dylan's team and the date when they were resolved and also the engineer that was responsible for them

Response: Here are the 10 most recently completed tickets in Bob Dylan's team:

1.     Ticket NDP0123456789
       Request Title: BEARER-REPLACEMENT-PROJECT
       Completed date: 2024-10-29
       Engineer: Jackie Robbins 2.     Ticket ABC0123456789
       Request Title: POWER-SPACE-CONNECTIVITY
       Completed date: 2024-09-30
       Engineer: Tim Sawyer

FIG. 20

Prompt: Show me the 3 tickets from yesterday with status. Show priority and engineer assigned. Show in table format.

Response: Here are the 3 tickets from yesterday with their priorities, assigned engineers, and status:

| Work Order Number | Request Date | Priority | Engineer | Status |
|---|---|---|---|---|
| ADC2345098544 | 2024-10-29  10:07:34 AM | Priority 2 | Richard Dickens | Accepted |
| BBH2340932432 | 2024-10-29  12:13:02 AM | Priority 3 | Sally Smith | Accepted |
| POL0109394888 | 2024-10-29  15:55:10 AM | Priority 2 | James Elrod | Accepted |

FIG. 2P

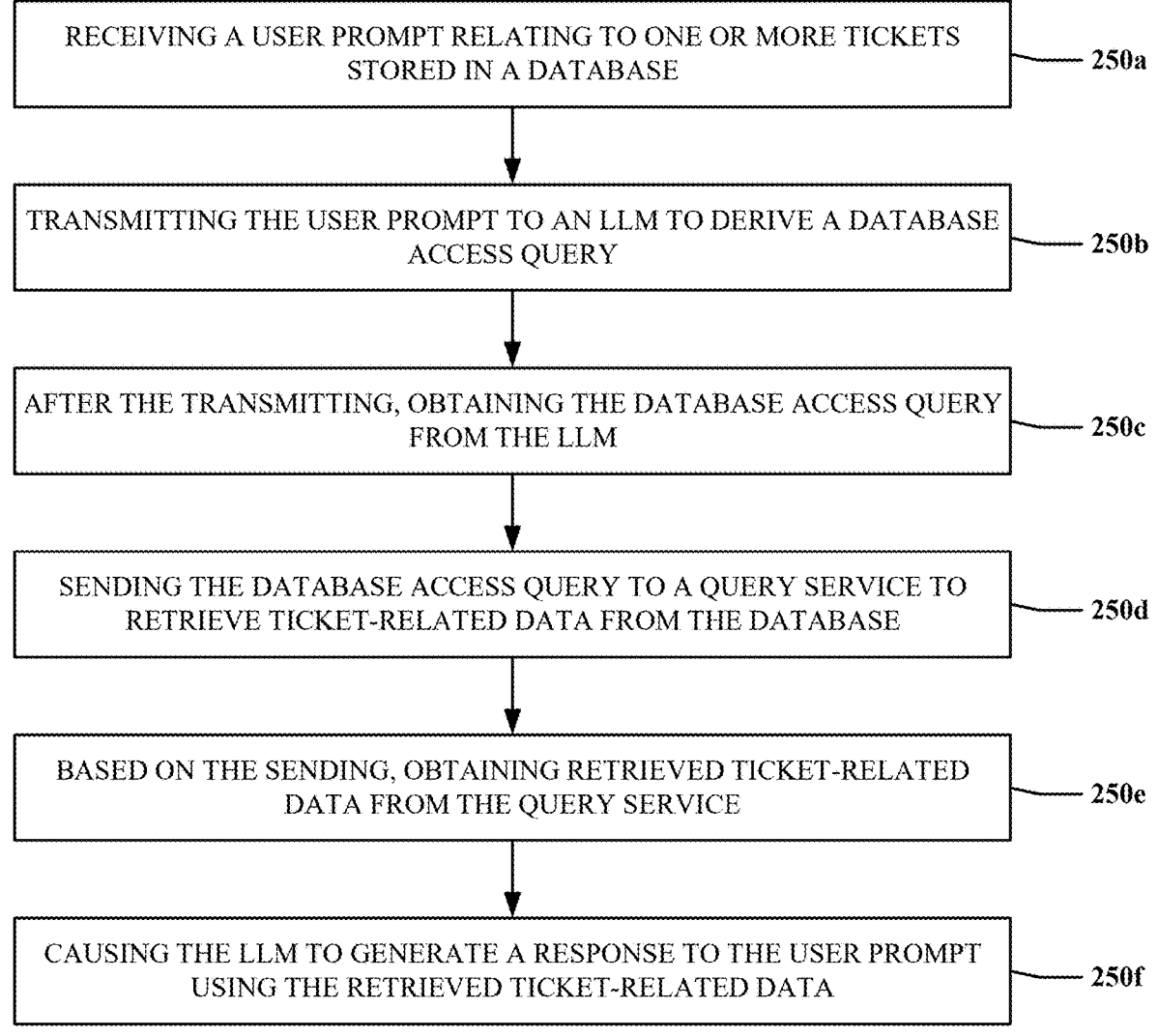

RECEIVING A USER PROMPT RELATING TO ONE OR MORE TICKETS STORED IN A DATABASE — 250a

TRANSMITTING THE USER PROMPT TO AN LLM TO DERIVE A DATABASE ACCESS QUERY — 250b

AFTER THE TRANSMITTING, OBTAINING THE DATABASE ACCESS QUERY FROM THE LLM — 250c

SENDING THE DATABASE ACCESS QUERY TO A QUERY SERVICE TO RETRIEVE TICKET-RELATED DATA FROM THE DATABASE — 250d

BASED ON THE SENDING, OBTAINING RETRIEVED TICKET-RELATED DATA FROM THE QUERY SERVICE — 250e

CAUSING THE LLM TO GENERATE A RESPONSE TO THE USER PROMPT USING THE RETRIEVED TICKET-RELATED DATA — 250f

METHOD AND SYSTEM FOR GENERATIVE ARTIFICIAL INTELLIGENCE (GENAI)-BASED ANALYSIS OF TICKET DATA

FIELD OF THE DISCLOSURE

The subject disclosure relates to generative artificial intelligence (GenAI)-based analysis of ticket data and/or document information.

BACKGROUND

In the realm of wireless networks, the inherent complexity of these systems often leads to the generation of various issues, ranging from minor glitches to major disruptions. When a trouble ticket is submitted, it is typically assigned to an engineer for resolution. However, these tickets are frequently intricate, involving multiple layers of child and grandchild tickets, and the solutions are not always readily apparent. Consequently, analysts or engineers must undertake the laborious task of searching for relevant information, which may be scattered across various documents, previously completed or resolved tickets, or other sources.

In many ticketing systems, ticket data, which can be enormous, is typically stored in Structured Query Language (SQL) databases. To generate reports from this data, users must possess knowledge of SQL and other programming languages. Existing tools, such as business intelligence platforms, require users to be proficient in their operation through extensive training. This reliance on specialized knowledge and manual processes not only hampers efficiency but also increases the likelihood of errors and delays in resolving network issues. Furthermore, creating such customized reports, including developing dashboards to present data in these reports, requires the use of various tools, scripts, and applications, which consumes undue amounts of computing resources as well as power resources.

BRIEF DESCRIPTION OF THE DRAWINGS

Reference will now be made to the accompanying drawings, which are not necessarily drawn to scale, and wherein:

FIGS. 2B to 2N illustrate an example of a tickets database that includes multiple tables that are organized within a defined schema, with example relationships (a through k) between elements in the schema, in accordance with various aspects described herein.

FIGS. 2O and 2P illustrate some example user prompts in relation to ticket-related information and corresponding responses that may be provided by a GenAI-based ticket analysis system, in accordance with various aspects described herein.

FIG. 2Q depicts an illustrative embodiment of a method in accordance with various aspects described herein.

DETAILED DESCRIPTION

Figure 1:
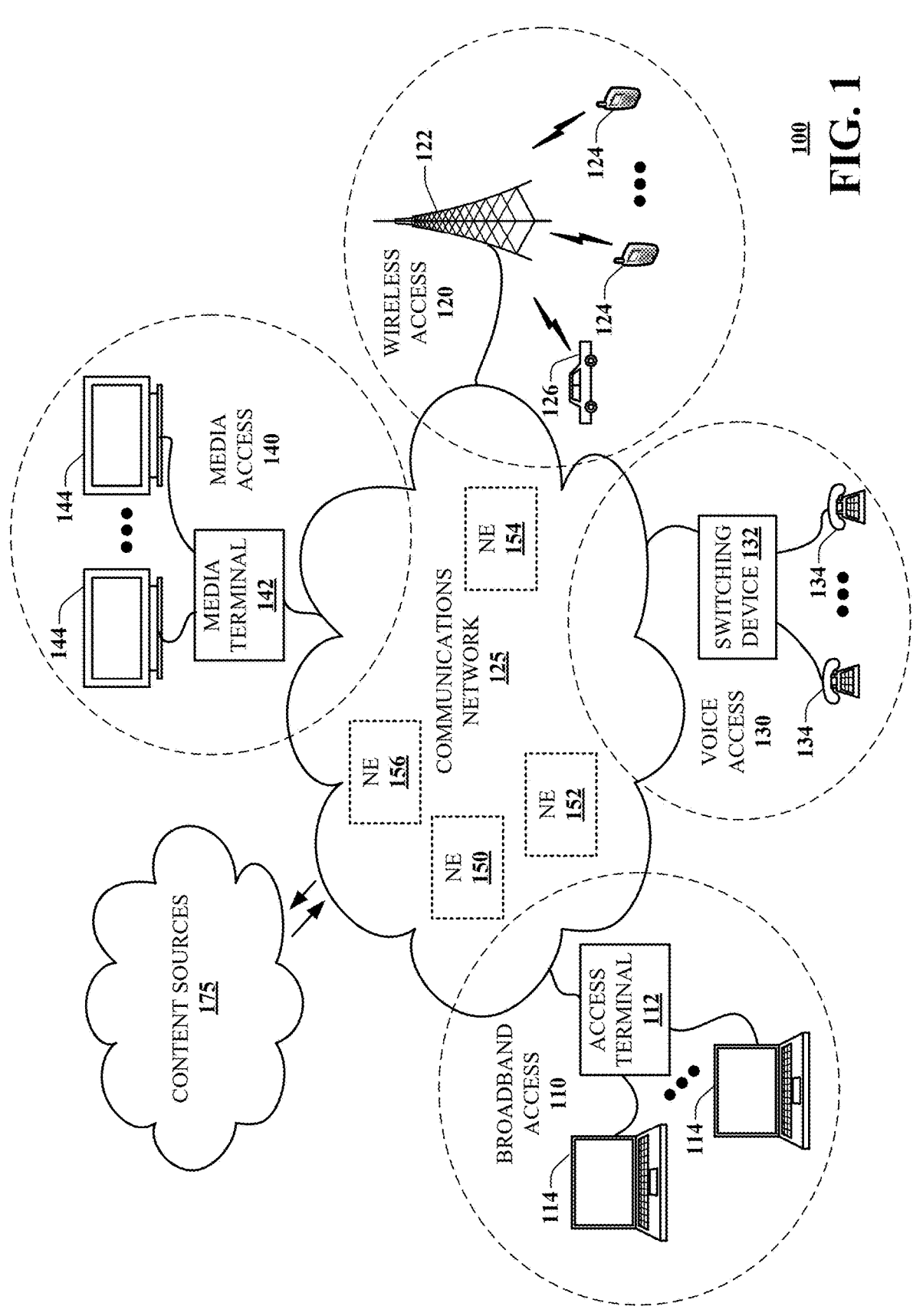
FIG. 1 is a block diagram illustrating an exemplary, non-limiting embodiment of a communications network in accordance with various aspects described herein.

The subject disclosure describes, among other things, illustrative embodiments of a GenAI-based ticket analysis system that is capable of leveraging an LLM to query a database for information. The analysis system may utilize natural language processing (NLP) to convert a natural language question or prompt into a database access query (e.g., an SQL query), thereby obviating a need for manual derivation of such access queries or menu-driven methods to retrieve data. The analysis system may employ deep learning neural network(s), K-means clustering, and/or nearest neighbor technology to understand the context of user prompts and/or to summarize retrieved data.

In one or more embodiments, the analysis system may interact with the LLM and a query service to respond to user prompts for ticket-related information. The LLM may access a prompt file that identifies a ticket database's structure and relationships or may be fine-tuned to learn these relationships from the prompt file, and may leverage these relationships to generate database access queries. The analysis system may forward generated database access queries to the query service to retrieve the appropriate ticket-related information from the tickets database. In some embodiments, the analysis system may be configured to provide recommendations on how to resolve tickets.

In various embodiments, the analysis system may interact with a vector database to identify or access document data (e.g., call flows, engineering design documents, standard operating procedures, database entries, wikis, logs, etc.) that addresses user prompts for document-related information. The analysis system may convert user prompts into vector representations and search the vector database for semantically similar vectors. This search may identify relevant documents that match the semantic meaning of the user's prompt, which the analysis system and/or the LLM may process to extract portions thereof for presentation to the user.

Exemplary embodiments of the GenAI-based ticket analysis system advantageously streamline the process of accessing and interpreting complex network information by leveraging natural language processing and AI-driven analytics. By automating the database querying and summarization of data retrieved from a database, the GenAI-based ticket analysis system reduces or eliminates the need for resource-intensive manual report generation and dashboard creation. This reduces cycle times for resolving network issues and reduces errors in troubleshooting processes, which enhances the speed of delivery of solutions and improves overall engineering productivity. The ability to query and converse with a database using natural language, as opposed to the traditional menu-driven method, allows for more intuitive and flexible interactions. Indeed, responses from the GenAI-based ticket analysis system advantageously enable users to gain insight into data in a faster and more efficient manner than creating individual reports for each metric that an operational staff member may be interested in, developing dashboards for each enterprise customer or partner vendor project, and building alarming infrastructure for end-to-end tooling and health monitoring. Additionally, the GenAI-based ticket analysis system can maintain the history and context of the conversation, which enables continuous dialogue and more effective information retrieval. Implementation of the GenAI-based ticket analysis system also reduces the consumption of computing and power resources that would otherwise be needed to run the numerous tools, scripts, and applications for creating individual reports and presenting customized dashboards. In one or more embodiments, the GenAI-based ticket analysis system may assist with troubleshooting network issues by providing recommendations on how to resolve such issues. As an example, the GenAI-based ticket analysis system may identify an error message from one or more logs (e.g., stored in a centralized logging system), and may utilize that error message or a derivation thereof as a prompt to query the ticket database to retrieve related ticket(s). The GenAI-based ticket analysis system may analyze resolution information associated with these ticket(s) as well as analyze relevant (e.g., vectorized) design, operations, and/or requirements documents using a retrieval-augmented generation (RAG) approach. Based on the analyses, the GenAI-based ticket analysis system may generate one or more recommendations for resolving the issue.

One or more aspects of the subject disclosure include a device, comprising a processing system including a processor, and a memory that stores executable instructions that, when executed by the processing system, facilitate performance of operations. The operations can include receiving a user prompt relating to one or more tickets stored in a database. Further, the operations can include transmitting the user prompt to a large language model (LLM) to derive a database access query. Further, the operations can include after the transmitting, obtaining the database access query from the LLM. Further, the operations can include sending the database access query to a query service to retrieve ticket-related data from the database. Further, the operations can include based on the sending, obtaining retrieved ticket-related data from the query service. Further, the operations can include causing the LLM to generate a response to the user prompt using the retrieved ticket-related data.

One or more aspects of the subject disclosure include a non-transitory machine-readable medium, comprising executable instructions that, when executed by a processing system including a processor, facilitate performance of operations. The operations can include receiving a user prompt relating to tickets stored in a Structured Query Language (SQL) database, wherein the user prompt comprises a natural language question. Further, the operations can include providing the user prompt to an artificial intelligence (AI) model to derive an SQL query. Further, the operations can include obtaining the SQL query from the AI model. Further, the operations can include forwarding the SQL query to a query service to retrieve ticket-related data from the SQL database. Further, the operations can include based on the forwarding, obtaining retrieved ticket-related data from the query service. Further, the operations can include instructing the LLM to generate a response to the user prompt using the retrieved ticket-related data.

One or more aspects of the subject disclosure include a method. The method can comprise receiving, by a processing system including a processor, a user prompt relating to trouble tickets stored in a database. Further, the method can include transmitting, by the processing system, the user prompt to a large language model (LLM) to derive a database access query, wherein the LLM has access to or is trained on a prompt file that identifies a relational schema of the database. Further, the method can include after the transmitting, obtaining, by the processing system, the database access query from the LLM. Further, the method can include sending, by the processing system, the database access query to a query service to retrieve ticket-related data from the database. Further, the method can include obtaining, by the processing system, retrieved ticket-related data from the query service. Further, the method can include commanding, by the processing system, the LLM to prepare a response to the user prompt using the retrieved ticket-related data.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, GenAI-based analysis of ticket data and/or document information. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS)

modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
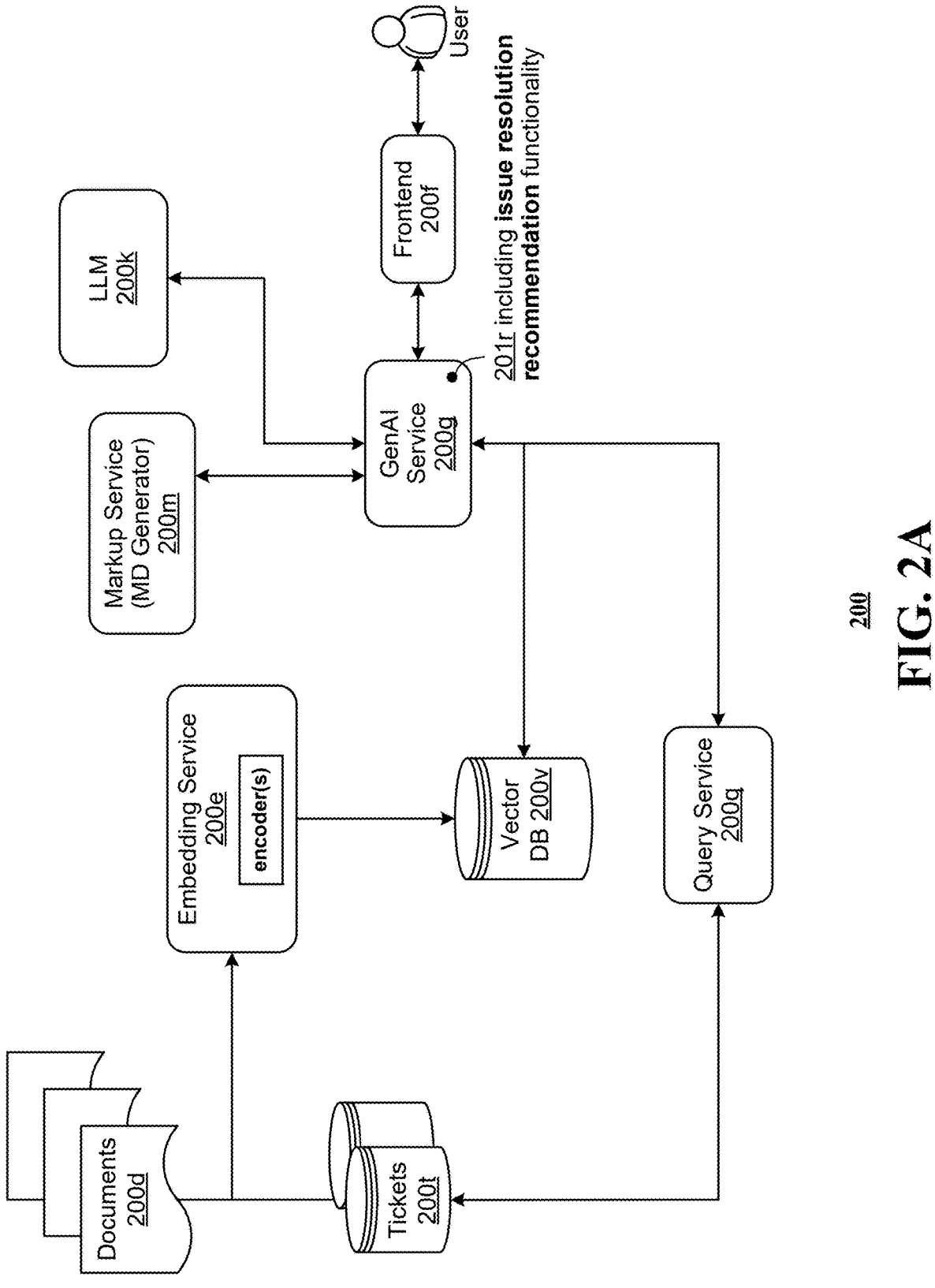
FIG. 2A is a block diagram illustrating an example, non-limiting embodiment of a system functioning within, or operatively overlaid upon, the communications network of FIG. 1 in accordance with various aspects described herein.
Figure 2B:
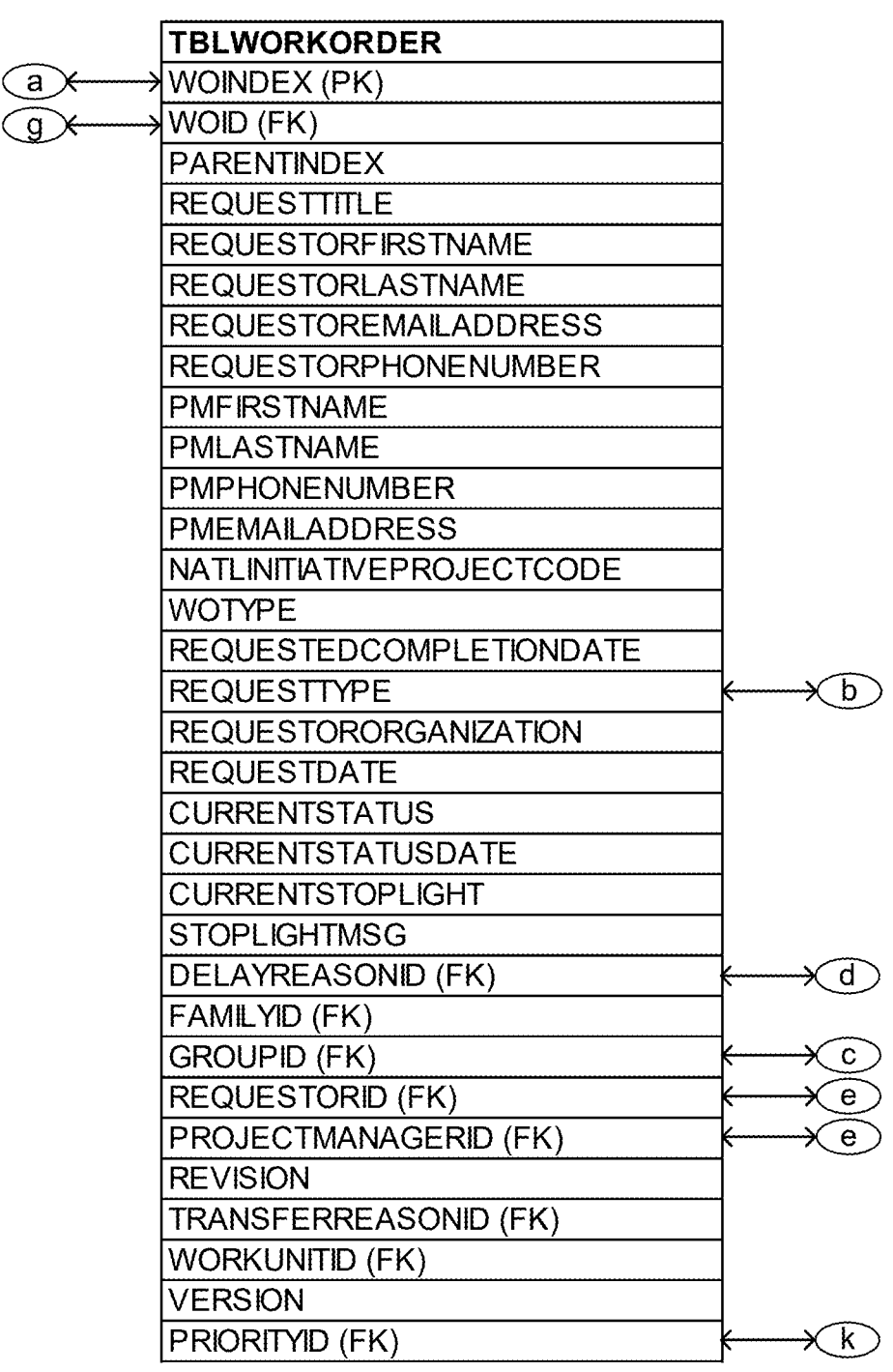
Figure 2C:
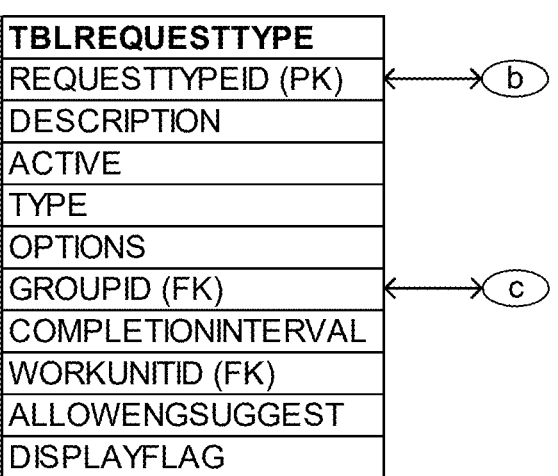
Figure 2D:
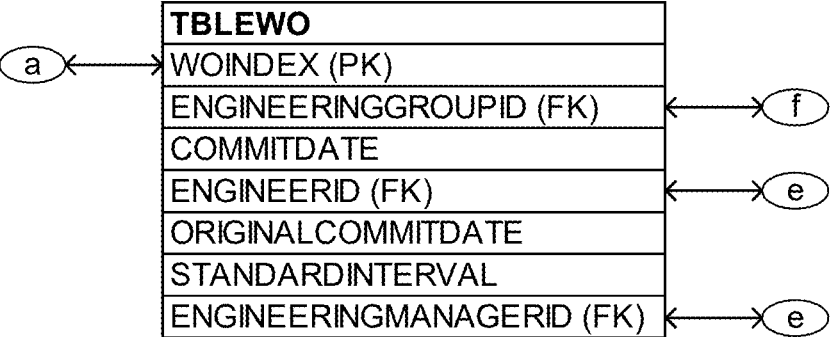
Figure 2E:
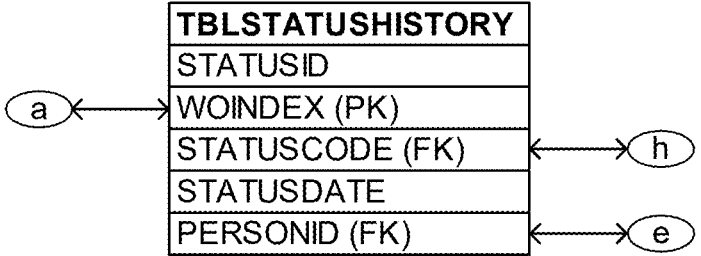
Figure 2F:
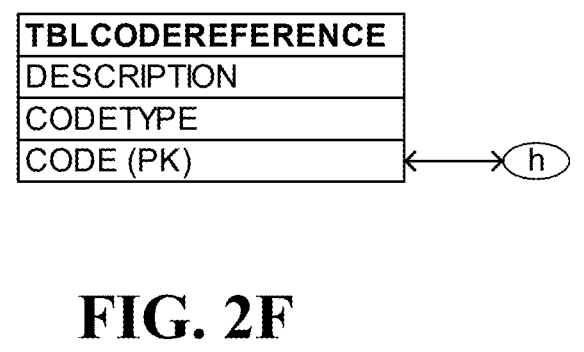
Figure 2G:
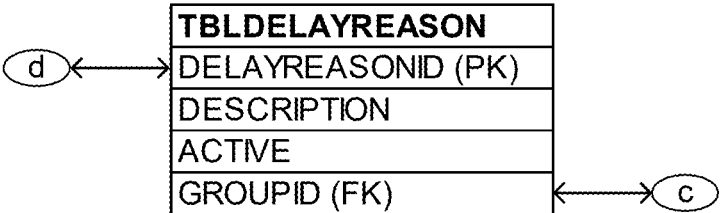
Figure 2H:
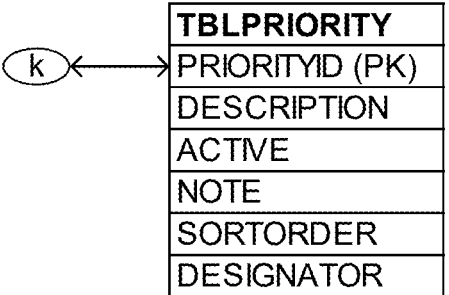
Figure 2I:
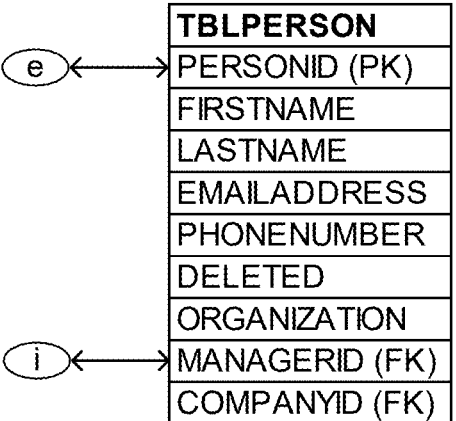
Figure 2J:
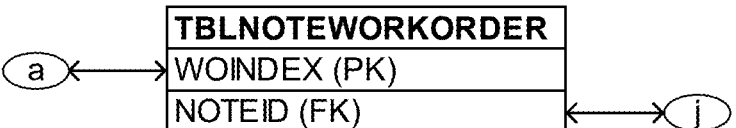
Figure 2K:
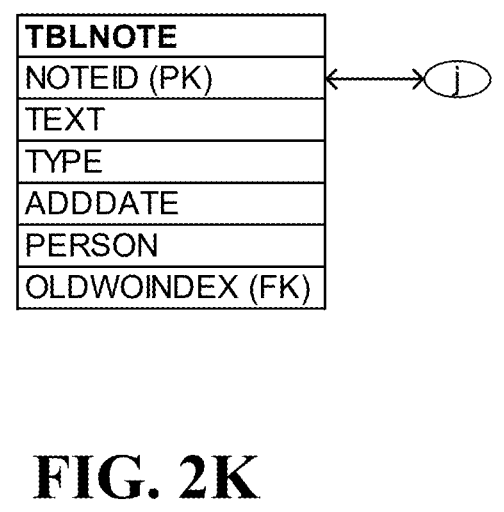
Figure 2L:
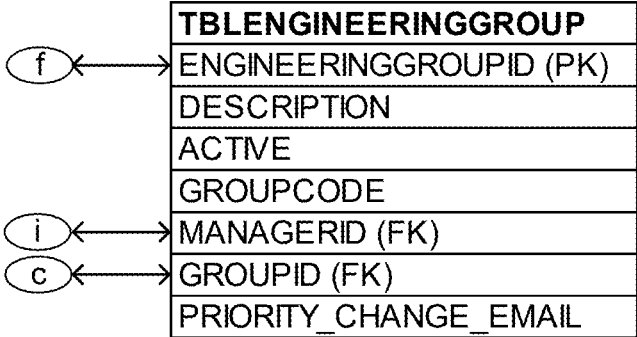
Figure 2M:
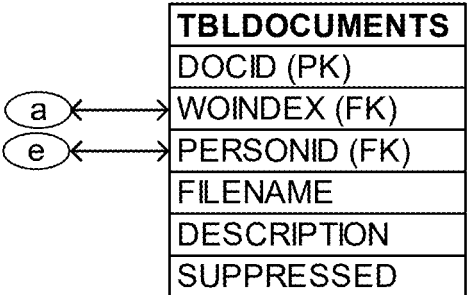
Figure 2N:
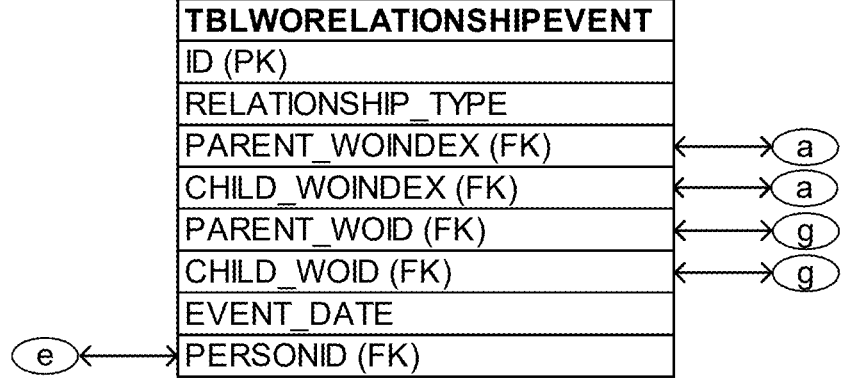

FIG. 2A is a block diagram illustrating an example, non-limiting embodiment of a GenAI-based ticket analysis system 200 functioning within, or operatively overlaid upon, the communications network of FIG. 1 in accordance with various aspects described herein. The GenAI-based ticket analysis system 200 may include a front end 200f, a GenAI service 200g, an LLM 200k, a query service 200q, a tickets database (DB) 200t, an embedding service 200e (having one or more encoders), a vector DB 200v, and a markup service (or markup document (MD) generator) 200m.

The frontend 200f may be a user interface (UI) (e.g., provided by way of a web-based application or the like) via which users may submit prompts and receive responses. The frontend 200f may serve as the initial point of contact for users that forwards user prompts to the GenAI service 200g for processing. A user may access the frontend 200f using a user device (not shown). Examples of a user device may include a mobile phone (e.g., a smart phone, a radiotelephone, etc.), a desktop computer, a laptop computer, a tablet computer, a handheld computer, a display device, a gaming device, a wearable communication device (e.g., a smart wristwatch, a pair of smart eyeglasses, augmented reality (AR)-/virtual reality (VR)-/mixed reality (MR)-related gear (e.g., a pair of glasses or googles, a headset, a hat, glove(s), a mask, a jacket, a sock or shoe, a pair of pants or shorts, headphones, and/or the like), etc.), a similar type of device, or a combination of some or all of these devices.

The query service 200q may be configured to receive database access queries (e.g., SQL queries) from the GenAI service 200g and utilize those queries to retrieve information from the tickets DB 200t. The tickets DB 200t may include records of network issues (e.g., tickets) and associated information, including, for instance, resolution data. FIGS. 2B to 2N illustrate an example of the tickets DB 200t that includes multiple tables that are organized within a defined schema, with example relationships (a through k) between elements in the schema. The tables may have a primary key (PK) and one or more foreign keys (FK) that refer to different tables. The example DB may be an SQL DB. In various embodiments, a prompt file (described in more detail below) may be derived to serves as an intermediary between the GenAI service 200g and the schema and relationships of the tickets DB 200t. While the example DB schema here relates to engineering and operations-related data, it will be understood and appreciated that the GenAI-based ticket analysis system 200 may be leveraged to analyze data for any schema with any level of complexity of relationships between elements.

Returning to FIG. 2A, the embedding service 200e may be configured to process documents 200d to create vector representations thereof. The documents 200d may include various types of documentation, such as engineering design documents, call flow documents, and/or logs. The embedding service 200e may employ one or more encoders to convert text data into numerical vectors that capture semantic meaning. In some embodiments, the embedding service 200e may include or may leverage a Bidirectional Encoder Representations from Transformer (BERT) model (e.g., that is based on the transformer model 270 of FIG. 2S, described in more detail below) to perform or facilitate the conversion of text data into vectors. In any case, the vector representations may be stored in the vector DB 200v, which enables the use case of document information gathering (described in more detail below). The vector DB 200v may be a specialized database that stores the vector representations in a way that allows the GenAI-based ticket analysis system 200 to find semantically similar documents quickly based on vector embeddings.

The GenAI service 200g may leverage AI techniques, and more particularly, the LLM 200k and/or the vector representations derived by the embedding service 200e, to respond to user prompts. The GenAI service 200g may communicate with the frontend 200f to receive user prompts and provide responses to the user prompts. The GenAI service 200g may also interact with the markup service 200m, which may be configured to convert GenAI-generated responses into a formatted markup language for presentation in a user-friendly/readable format.

In one or more embodiments, the GenAI service 200g may be configured to respond to user prompts for ticket-related information by interacting with the LLM 200k and the query service 200q. The LLM 200k may either have access to a prompt file or, in some embodiments, may be fine-tuned to learn the ticket DB 200t's structure and relationships that are documented in the prompt file and thus utilize its training to identify database access queries (e.g., SQL queries) that correspond to natural language queries. For a given user prompt, the GenAI service 200g may forward the natural language question to the LLM 200k to generate a corresponding database access query, and may forward the generated database access query to the query service 200q to retrieve the appropriate ticket-related information from the tickets DB 200t.

In one or more embodiments, the GenAI service 200g may interact with the vector DB 200v to find document data that addresses corresponding user prompts for document-related information. The GenAI service 200g may be configured convert a given user prompt into a vector representation and search the vector DB 200v for semantically similar vectors. This search may identify relevant documents that match the semantic meaning of the user's prompt, which the GenAI service 200g and/or the LLM 200k can process to extract portion(s) thereof for presentation to the user.

The integration of the components in the GenAI-based ticket analysis system therefore advantageously facilitates the retrieval and summarization of (e.g., engineering and operations) tickets and information using natural language by converting user prompts into database access queries that can be utilized to retrieve information from a tickets DB. The integration additionally, or alternatively, facilitates the retrieval and summarization of (e.g., engineering and operations) documentation information using natural language by converting user prompts into vectors that are then used to search for semantic similarities in stored vector representations of document data.

FIGS. 2O and 2P illustrate some example user prompts in relation to ticket-related information and corresponding responses that may be provided by the GenAI-based ticket analysis system 200. The following are additional example user prompts and corresponding responses that may be provided by the GenAI-based ticket analysis system 200:

User Prompt: Show my ticket #s that are waiting on children

Response: The ticket numbers for your tickets that are currently "Waiting On Children" are NDS0001123 and NDS1112234.

User Prompt: Who is the engineer for the above two tickets

Response: The engineer for both tickets NDS0001123 and NDS1112234 is John Smith.

User Prompt: Who is the manager of the above engineer

Response: The manager for the engineer John Smith is Jane Doe.

It will be understood and appreciated that the GenAI-based ticket analysis system 200 may be capable of providing responses to a variety of user prompts. Additional examples user prompts are as follows:

Show my 3 tickets with children and grandchildren

Show the details of tickets SAW1234567, SAW2345678, DRA3456788. Show engineer, manager, and description.

Show the description of tickets SAW1234567, SAW2345678, DRA3456788. Show in table form.

Give me a report of my 5 most recent completed tickets. Show engineer and manager.

Show my 2 tickets with documents attached

Show the 3 most recent outage related tickets etc.

The following is a description of an example operational flow that may be triggered by a user-submitted prompt (i.e., a natural language question or command) for ticket-related information. A user may submit the natural language question or command via the frontend 200f, which may forward it to the GenAI service 200g. Upon receiving this query, the GenAI service 200g may transmit it to the LLM model 200k to cause the LLM model 200k to predict or output a corresponding SQL query. The LLM model 200k may predict or output the corresponding SQL query based on the LLM model 200k's understanding of the database structure and relationships from the above-described prompt file. For instance, assume that a user submits the natural language query, "What are the unresolved network issues assigned to John Doe?" The LLM model 200k may either access the prompt file or, in some embodiments, may be fine-tuned to learn the database structure and relationships in the prompt file and thus utilize its training to identify the corresponding SQL query. As an example, the prompt file may indicate that TBLWORKORDER contains work order details and TBL-PERSON contains personnel information, with a foreign key linking the two tables. The LLM model 200k may leverage this understanding of the scheme to generate the corresponding SQL query—e.g., an SQL query such as:

SELECT*FROM TBLWORKORDER WHERE CURRENTSTATUS='Unresolved' AND PERSONID= (SELECT PERSONID FROM TBLPERSON WHERE FIRSTNAME='John' AND LASTNAME='Doe')

The GenAI service 200g may obtain the generated SQL query from the LLM 200k, and may pass this SQL query to the query service 200q to use to retrieve ticket-related data from the tickets database 200t. Upon receiving the retrieved information from the query service 200q, the GenAI service 200g may pass this information to the LLM model 200k for further processing. This processing may include tasks such as filtering, summarizing, and/or contextualizing the data to ensure that it is relevant and comprehensible to the user, particularly that it is responsive to what the user has asked for. The LLM model 200k may send the processed information to the GenAI service 200g, which may then interact with the markup service 200m for formatting. The markup service 200m may convert the processed information into a formatted markup language such that the response is presented in a user-friendly and readable format. The GenAI service 200g may then send the formatted response to the frontend 200f for presentation to the user.

The following is a description of an example operational flow that may be triggered by a user-submitted prompt (i.e., a natural language question or command) for document-related information. A user may submit the natural language question or command via the frontend 200f, which may forward it to the GenAI service 200g. Upon receiving this query, the GenAI service 200g may convert the prompt into a vector representation using the embedding service 200e. The embedding service 200e may employ one or more encoders, such as a BERT model based on the transformer model 270 of FIG. 2S, to convert the text data into numerical vectors that capture semantic meaning. Once the prompt is converted into a vector representation, the GenAI service 200g may search the vector DB 200v for semantically similar vectors. The vector DB 200v may store vector representations of various documents 200d, such as engineering design documents, call flow documents, and logs. This search may identify relevant documents that match the semantic meaning of the user's prompt. The GenAI service 200g may then retrieve the appropriate document-related information from the vector DB 200v, and may pass the retrieved information to the LLM model 200k for further processing. This processing may include tasks such as filtering, summarizing, and/or contextualizing the data to ensure that it is relevant and comprehensible to the user, particularly that it is responsive to what the user has asked for. The LLM model 200k may send the processed information to the GenAI service 200g, which may then interact with the markup service 200m for formatting. The markup service 200m may convert the processed information into a formatted markup language such that the response is presented in a user-friendly and readable format. The GenAI service 200g may then send the formatted response to the frontend 200f for presentation to the user.

In one or more embodiments, the GenAI service 200g may be capable of facilitating interpretation and summarization of diagrams (e.g., visual drawings or figures) that may be included in retrieved documentation information. In these embodiments, the LLM 200k may, for instance, be trained and/or fine-tuned to analyze diagrams and generate text-based descriptions thereof. For instance, when a user submits a prompt that is associated with a diagram which has been retrieved from the documents 200d and presented to the user via the frontend 200f, the GenAI service 200g may coordinate with the LLM 200k to interpret the diagram and provide a summarized description thereof. This is particularly useful for complex diagrams since it would allow users to quickly understand the key elements and relationships within the diagram.

In various embodiments, the GenAI service 200g may be capable of providing (e.g., 201r) intelligent recommendations and options for resolving network issues. When a user submits a prompt describing a specific issue or based on detection of an error message or the like that is stored in a centralized logging system, the GenAI service 200g can search for similar issues in the tickets DB 200t and/or relevant documents stored in the vector DB 200v. By analyzing the context and content of these historical records, the GenAI service 200g, in conjunction with the LLM 200k, can generate a list of recommended actions to resolve the current issue. For example, consider a user submitting a prompt such as, "Here is the issue we have: intermittent network outages in the downtown area. How do we resolve this?" or an error message having been detected that relates to a device connection failure. The GenAI service 200g may utilize the LLM 200k to understand this as a natural language input and generate an appropriate SQL query to search the tickets DB 200t for similar incidents. The LLM 200k may also assist in interpreting the retrieved data and identifying relevant tickets that describe similar network outages. Additionally, the GenAI service 200g may retrieve associated documents, such as engineering design documents, call flow documents, and/or logs, from the vector DB 200v. Once the relevant information is gathered, the GenAI service 200g may, with the aid of the LLM 200k, analyze the data to identify patterns and common solutions that were effective in resolving similar issues, and may cause recommendation(s) to be presented to the user.

In various embodiments, the GenAI service 200g may cause an SQL query derived by the LLM 200k to be modified or adjusted based on one or more conditions being satisfied. For example, an organization may have a hierarchical structure where some users have more permissions to access higher levels or more restricted information than other users. The GenAI service 200g can use such permission information to tweak the SQL query so that parts of the SQL query corresponding to restricted information are left out or removed for users without the necessary permissions. For instance, assume that a user with limited access permissions, such as a junior engineer, submits a query. The GenAI service 200g may generate an initial SQL query, and may then modify this SQL query to exclude portion(s) thereof that correspond to retrieval of sensitive information that the user is not authorized to access. For instance, assume that the user is restricted from accessing information about engineer names, and submits a user prompt such as "What are the recent tickets of the XYZ team, and who are the engineers responsible?" In this case, the GenAI service 200g may modify the SQL query to exclude portion(s) of the SQL query that correspond to retrieval of engineer names. Consequently, the output presented to the user may include (e.g., only) the recent tickets and their status, without revealing the engineer names.

As another example, an organization may set restrictions on what information a user can access based on the user's location. In a case where a user is located in a particular region that is deemed or determined to be unsafe, for instance, certain information may be restricted from being presented to the user. In this case, the GenAI service 200g can use such location-based permission information to tweak the SQL query so that parts of the SQL query corresponding to restricted information are left out or removed. For instance, assume a user that is located in a restricted or deemed unsafe area submits a query. The GenAI service 200g can generate an initial SQL query, and may then modify the SQL query to exclude portion(s) thereof that correspond to information that is restricted based on the user's location.

In certain alternative embodiments, the GenAI service 200g may submit the user's prompt in natural language along with a command that identifies the restriction associated with the user (e.g., hierarchical permissions, location, or any other condition). The LLM 200k may then consider these restrictions when generating the SQL query and may leave out or remove portion(s) of the SQL query that would otherwise correspond to retrieval of restricted information. For instance, assume that a user with specific restrictions submits a query. The GenAI service 200g can include a command that identifies the restriction(s), and the LLM 200k may generate an initial SQL query, and may then modify this SQL query based on the restriction command so as to exclude portion(s) of the SQL query that correspond to retrieval of the restricted information.

In one or more embodiments, the GenAI service 200g may apply thresholding to determine the appropriate SQL query to utilize. Thresholding can be applied to any information associated with a user, such as access level, location, or other relevant criteria. For example, if a user's access level exceeds a certain threshold, the GenAI service 200g may include generate an SQL query that results in retrieval of requested information (e.g., all of the requested information that is consistent with the user's access level). If the user's access level is determined not to meet the threshold, however, the GenAI service 200g may generate an initial SQL query, and may then modify this SQL query based on the determination so as to exclude portion(s) of the SQL query that correspond to retrieval of restricted information. As an example, assume that a user with an access level that is below the threshold submits a query for restricted information. The GenAI service 200g may modify the SQL query to exclude portion(s) of the SQL query that correspond to retrieval of the restricted information.

In various embodiments, the GenAI service 200g may cause a response to a user prompt to be provided in a manner that automatically triggers a device of the user, such as a user equipment (UE) or a mobile device of the user, to perform certain actions based on data in the response, such as automatically activating (or opening) and updating a log file or a tracking application. As one example, assume that a user submits a prompt via the frontend 200f, requesting the status of unresolved network issues assigned to the user's team. The GenAI service 200g may send the query to the LLM 200k, which may generate the appropriate SQL query that the GenAI service 200g may transmit the SQL query to the query service 200q to obtain the relevant information from the tickets database 200t. Upon receiving the retrieved information, the GenAI service 200*g* may leverage the LLM 200*k* and/or the markup service 200*m* to generate a user-friendly response. This response may be accompanied by an instruction or command to the frontend 200*f* that is configured to cause the user's device to automatically open and update a log file on the user's device that tracks the status of network issues. As another example, assume that a user submits a prompt via the frontend 200*f*, requesting the status of unresolved network issues assigned to the user's team. The GenAI service 200*g* may send the query to the LLM 200*k*, which may generate the appropriate SQL query that the GenAI service 200*g* may transmit to the query service 200*q* to obtain the relevant information from the tickets database 200*t*. Upon receiving the retrieved information, the GenAI service 200*g* may leverage the LLM 200*k* and/or the markup service 200*m* to generate a user-friendly response. This response may be accompanied by an instruction or command to the frontend 200*f* that is configured to cause the user's device to automatically open and update an network status monitoring application (e.g., a tool with a UI and/or access to a database) on the user's device.

In one or more embodiments, the GenAI-based ticket analysis system 200 may provide time-sensitive updates to users even when they are not actively requesting data from, or monitoring changes to ticket data, in the tickets database 200*t*. For instance, the GenAI service may receive a user request to generate an alert when specific ticket data conditions are met, such as a ticket resolution engineer's contact information (e.g., phone number or messaging ID) being added to a ticket. In this case, the GenAI service 200*g* may track changes to the tickets database by commanding the LLM 200*k* to generate query for the information, and utilizing that query, by way of the query service 200*q*, to periodically access the tickets database 200*t* to check if the condition has been met. If the condition is detected—e.g., the working engineer's contact information has been added to a ticket, the GenAI service 200*g* may transmit an alert with a command to the user device that activates an application thereon. This application may cause the alert to be displayed, and may trigger a phone application or a messaging application to automatically open and call or connect with the engineer using the contact information. This advantageously allows a user to receive critical information and immediately engage with a ticket resolution engineer to monitor or supervise the resolution process.

It is to be understood and appreciated that, although FIG. 2A might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, services, devices, systems, models, etc. may have been illustrated in FIG. 2A as separate components, services, devices, systems, models, etc., it will be appreciated that multiple components, services, devices, systems, models, etc. can be implemented as a single component, service, device, system, model, etc., or a single component, service, device, system, model, etc. can be implemented as multiple components, services, devices, systems, models, etc. Additionally, functions described as being performed by one component, service, device, system, model, etc. may be performed by multiple components, services, devices, systems, models, etc., or functions described as being performed by multiple components, services, devices, systems, models, etc. may be performed by a single component, service, device, system, model, etc.

FIG. 2Q depicts an illustrative embodiment of a method 250 in accordance with various aspects described herein.

At 250*a*, the method can include receiving a user prompt relating to one or more tickets stored in a database. For example, the GenAI service 200*g* can, similar to that described above with respect to FIG. 2A, perform one or more operations that include receiving a user prompt relating to one or more tickets stored in the tickets database 200*t*.

At 250*b*, the method can include transmitting the user prompt to an LLM to derive a database access query. For example, the GenAI service 200*g* can, similar to that described above with respect to FIG. 2A, perform one or more operations that include transmitting the user prompt to the LLM 200*k* to derive a database access query.

At 250*c*, the method can include after the transmitting, obtaining the database access query from the LLM. For example, the GenAI service 200*g* can, similar to that described above with respect to FIG. 2A, perform one or more operations that include after the transmitting, obtaining the database access query from the LLM 200*k*.

At 250*d*, the method can include sending the database access query to a query service to retrieve ticket-related data from the database. For example, the GenAI service 200*g* can, similar to that described above with respect to FIG. 2A, perform one or more operations that include sending the database access query to the query service 200*q* to retrieve ticket-related data from the tickets database 200*t*.

At 250*e*, the method can include based on the sending, obtaining retrieved ticket-related data from the query service. For example, the GenAI service 200*g* can, similar to that described above with respect to FIG. 2A, perform one or more operations that include based on the sending, obtaining retrieved ticket-related data from the query service 200*q*.

At 250*f*, the method can include causing the LLM to generate a response to the user prompt using the retrieved ticket-related data. For example, the GenAI service 200*g* can, similar to that described above with respect to FIG. 2A, perform one or more operations that include causing the LLM 200*k* to generate a response to the user prompt using the retrieved ticket-related data.

While for purposes of simplicity of explanation, the respective processes are shown and described as a series of blocks in FIG. 2Q, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2R:
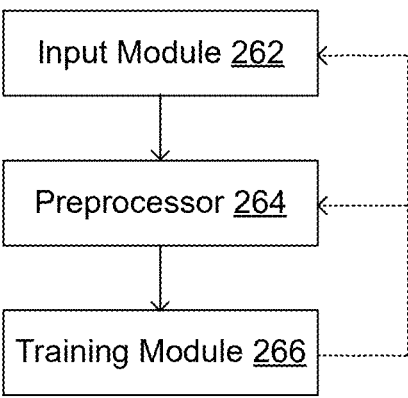
FIG. 2R is a diagram of an example AI architecture, which may be used to facilitate training or pre-training of one or more AI models, including, for instance, large language models (LLMs), in accordance with various aspects described herein.

Referring to FIG. 2R, an example AI architecture 260 may be used to facilitate training and/or pre-training of AI models, such as AI model(s) described above with respect to FIG. 2A. For instance, the AI architecture 260 may be used to facilitate training and/or pre-training of an LLM, such as the LLM 200*k*, an LLM associated with the embedding service 200*e*, and/or any other LLM that is based on the transformer model 270 illustrated in FIG. 2S and described in more detail below. The AI architecture 260 may include an input module 262, a preprocessor 264, and a training module 266. Some or all of these modules, which may be referred to as programs, processors, or agents, may be realized based on execution of instructions or data by one or more processors of a computing (or machine learning (ML))

system, such as the computing system 400 of FIG. 4 (described in more detail below).

The input module 262 may allow for input of (e.g., user-provided) data, such as datasets, parameters (e.g., weights, biases, and/or the like), etc., that can be used to train models and/or obtain predictions from models. In some cases, datasets may be labeled and may include inputs (e.g., observed or measured values) and known output data. Labeled datasets may facilitate supervised (or guided) learning.

Although not shown, the AI architecture 260 may include a library of ML models or algorithms, such as, for instance, one or more classifiers (e.g., a naïve Bayes classifier or the like), one or more support vector machines, one or more artificial neural networks (e.g., transformer neural networks, convolutional neural networks, and/or the like), one or more learned decision trees, and so on. Each of the ML algorithms may be associated with various parameters.

The preprocessor 264 may be equipped with one or more preprocessing algorithms that are configured to prepare input datasets for processing by the training module 266. Such preprocessing may include discretization (where values are binned or converted into nominal values), component analysis, data estimation, feature selection, feature extraction (e.g., dimensionality reduction, data removal, statistical analysis, threshold-based filtering, etc.), data interpolation, and/or the like.

The training module 266 may be configured to train and evaluate ML models. As an example, the training module 266 may be configured to perform unsupervised learning and/or supervised learning based in input datasets. In exemplary embodiments, the training module 266 may be capable of training and/or evaluating the performance of multiple models in parallel. In one or more implementations, the training module 266 may, despite operating on multiple ML models in parallel, train and evaluate the various ML models individually. In some implementations, the training module 266 may be capable of combining the procedure outcomes of multiple models to derive an aggregate outcome. Model evaluation or validation may involve a comparison of model outputs to known outputs or an analysis of model outputs relative to desired metrics.

In exemplary embodiments, certain processing techniques may be employed to generate usable data sets for feeding into the AI architecture 260 to train deep learning neural network model(s) to output predictions. Although not shown, the AI architecture 260 may include additional functional modules, such as those for gathering performance results and presenting (e.g., displaying) data regarding the results. While various components, modules, etc. may have been illustrated in FIG. 2R as separate components, modules, etc., it will be appreciated that multiple components, modules, etc. may be implemented as a single component, module, etc., or a single component, module, etc. may be implemented as multiple components, modules, etc. Additionally, functions described as being performed by one component, module, etc. may be performed by multiple components, modules, etc., or functions described as being performed by multiple components, modules, etc. may be performed by a single component, module, etc.

Figure 2S:
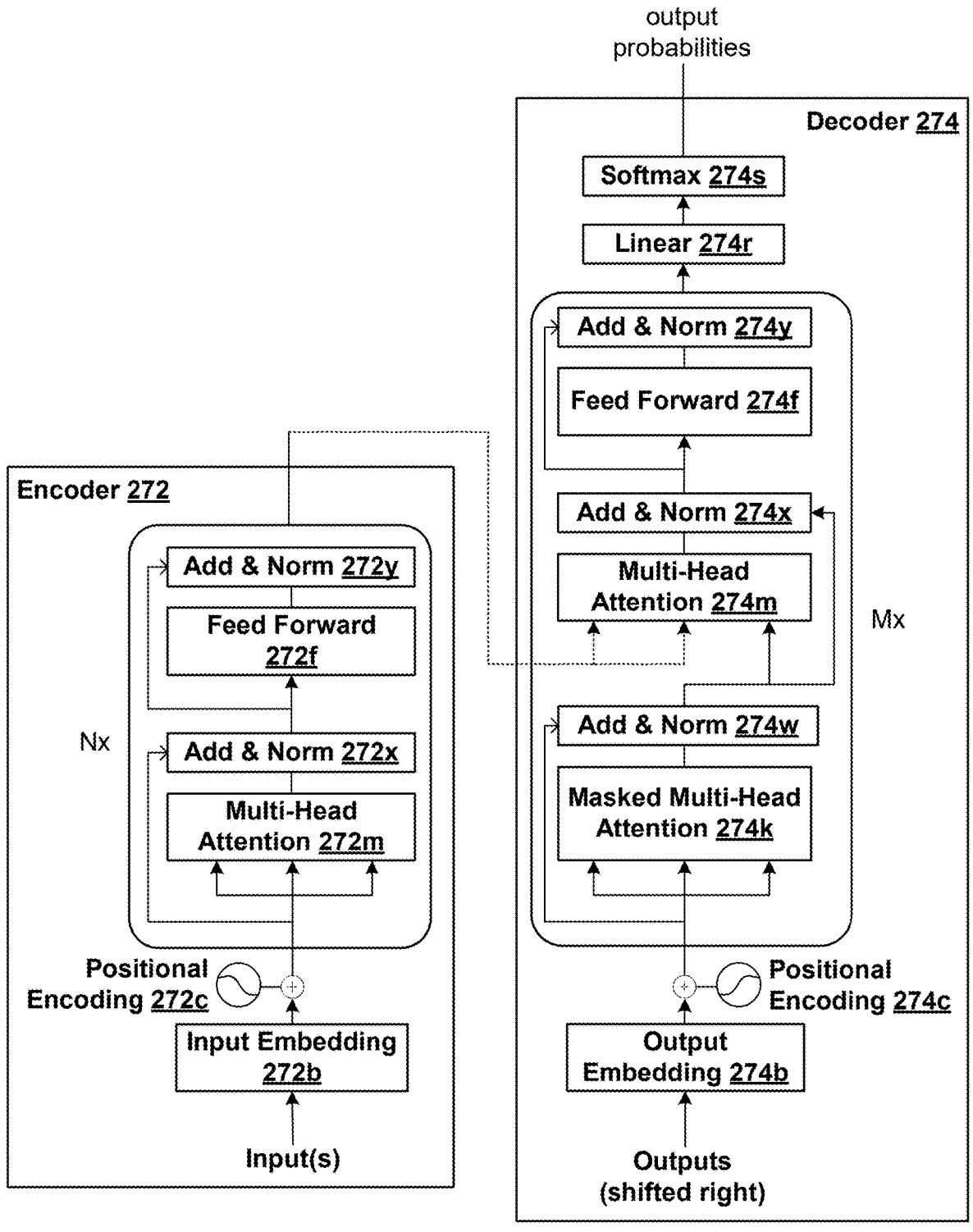
FIG. 2S is a diagram of an example transformer model, a portion or an entirety of which may serve as a functional building block of one or more LLMs, in accordance with various aspects described herein.

Referring to FIG. 2S, an example transformer model 270 (a portion or an entirety of which may serve as a functional building block of one or more LLMs (e.g., the LLM 200k, an LLM associated with the embedding service 200e, etc.)) may include an encoder 272 and a decoder 274. The encoder 272 may include an input embedding block 272b, a positional encoder 272c, and a series of (i.e., multiple (Nx))

identical layers that each has a multi-head attention block 272m and a feed forward block 272f. An input (e.g., text, such as a query or a prompt) may be converted into individual tokens (e.g., words, characters, etc.) that are fed into the input embedding block 272b. The input embedding block 272b may convert the tokens into continuous vectors, where each token is mapped to a high-dimensional space by way of a learned embedding matrix. The embedding matrix may be implemented in a lookup table or the like, where token indexes are associated with different vectors of a fixed size. The positional encoder 272c may derive fixed positional encodings or learned positional encodings to help capture positional information of tokens. Fixed positioning encodings may be generated using sinusoidal functions, where the different frequencies of sine/cosine functions correspond to unique positional encodings for the different positions in a given sequence. Learned positional encodings may be learned during training based on initially randomly chosen values that are optimized as part of the training process. In any case, the positional encodings may be combined with the input embeddings from the input embedding block 272b on an element-by-element basis, resulting in a processed input that may be fed into the series of layers. The processed input may be fed into the multi-head attention block 272m in the first layer. An addition (or residual connection) and normalization block 272x may operate on the processed input and the output of that multi-head attention block 272m. The output of the addition and normalization block 272x may be passed to the feed forward block 272f in that layer. An addition and normalization block 272y may operate on the output of the addition and normalization block 272x and the output of the feed forward block 272f. In essence, the multi-head attention block 272m of a given layer may enable the feed forward block 272f in that layer to model long term dependencies. Multi-head attention allows the model to simultaneously attend to different parts of the input sequence and weigh their importance based on the input sequence's internal relationships. This attention mechanism may be combined with the input sequence's representations to produce a new set of weighted representations. Iterating the identical layers allows the model to learn complex patterns and relationships in the data.

The decoder 274 may include an output embedding block 274b, a positional encoder 274c, and a series of (i.e., multiple (Mx)) identical layers that each has a masked multi-head attention block 274k, a multi head attention block 274m, and a feed forward block 274f. An output (shifted right) may be converted into individual tokens that are fed into the output embedding block 274b. The output embedding block 274b may convert the tokens into continuous vectors. The positional encoder 274c may derive fixed positional encodings or learned positional encodings to help capture positional information of tokens. The processed output may be fed into the masked multi-head attention block 274k in the first layer. An addition and normalization block 274w may operate on the processed output and the output of that masked multi-head attention block 274k. The output of the addition and normalization block 274w may be passed to the multi-head attention block 274m in that layer. Output(s) from the encoder 272 may also be fed into the multi-head attention block 274m. An addition and normalization block 274x may operate on the output of the addition and normalization block 274w and the output of multi-head attention block 274m. The output of the addition and normalization block 274x may be passed to the a feed forward block 274f in that layer. An addition and normalization block 274y may operate on the output of the addition and normalization block 274*x* and the output of the feed forward block 274*f*. The output of the addition and normalization block 274*y* may may be passed to a linear layer 274*r*, which may transform that output into a higher-dimensional space. The output of the linear layer 274*r* may be fed into a softmax layer 274*s*, which may be a non-linear activation function that normalizes the output to a probability distribution to ensure that all values are non-negative and add up to 1. Iterating the identical layers allows the model to learn complex patterns and relationships in the data.

Various types of transformer-based LLMs may be constructed by "stacking" the identical layers of the encoder 272 and/or the decoder 274 in particular arrangements and in combination with additional refinements/components. A given LLM constructed as such may then be trained or pre trained (e.g., using the AI architecture 260 of FIG. 2R, a similar AI architecture, a different AI architecture or a combination of some or all of these AI architectures) on a corpus of information and/or finetuned or instruction tuned to analyze/generate data (e.g., text, audio, and/or images).

Figure 3:
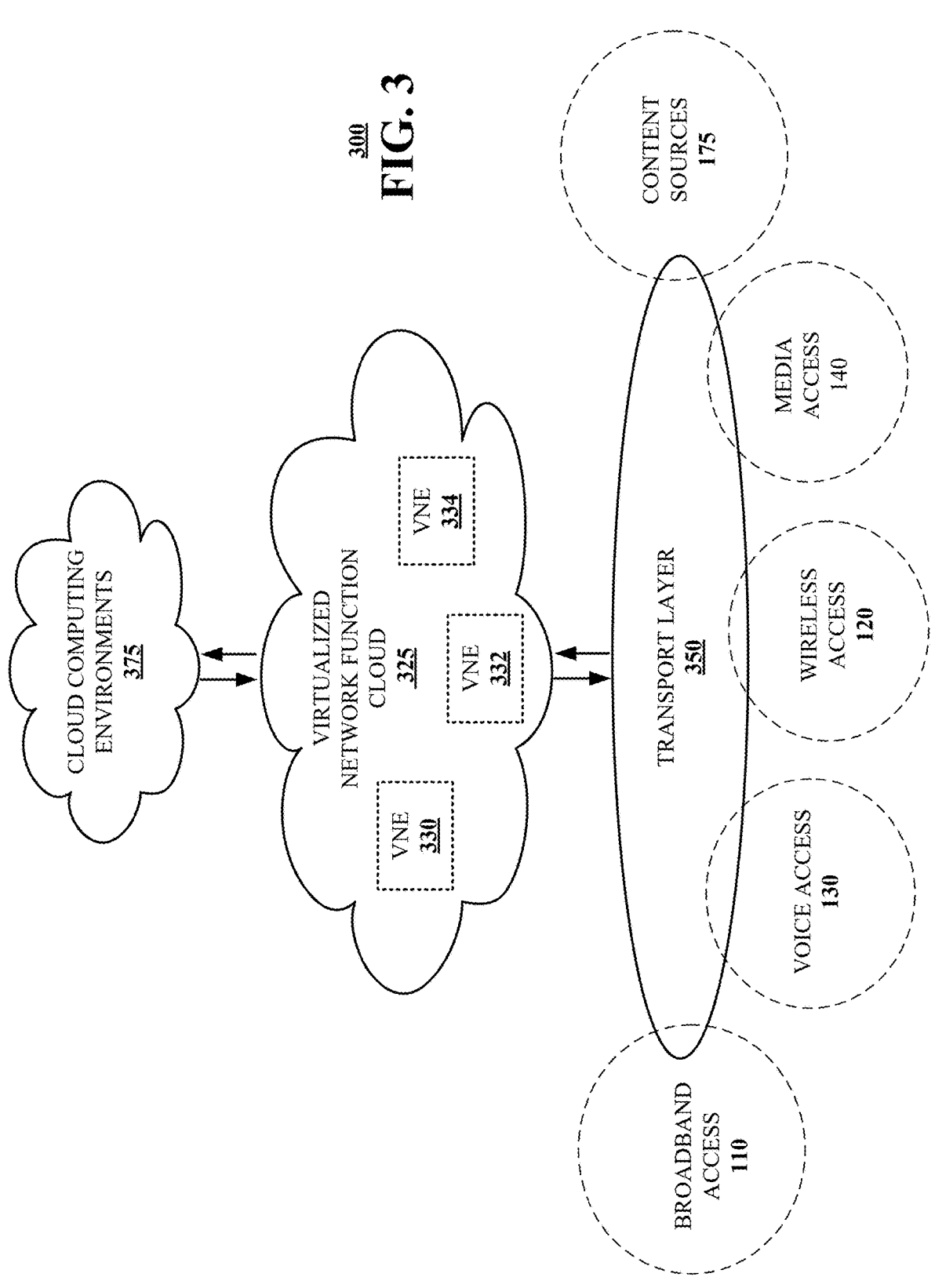
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 250 presented in FIGS. 1, 2A, and 2Q. For example, virtualized communications network 300 can facilitate, in whole or in part, GenAI-based analysis of ticket data and/or document information.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
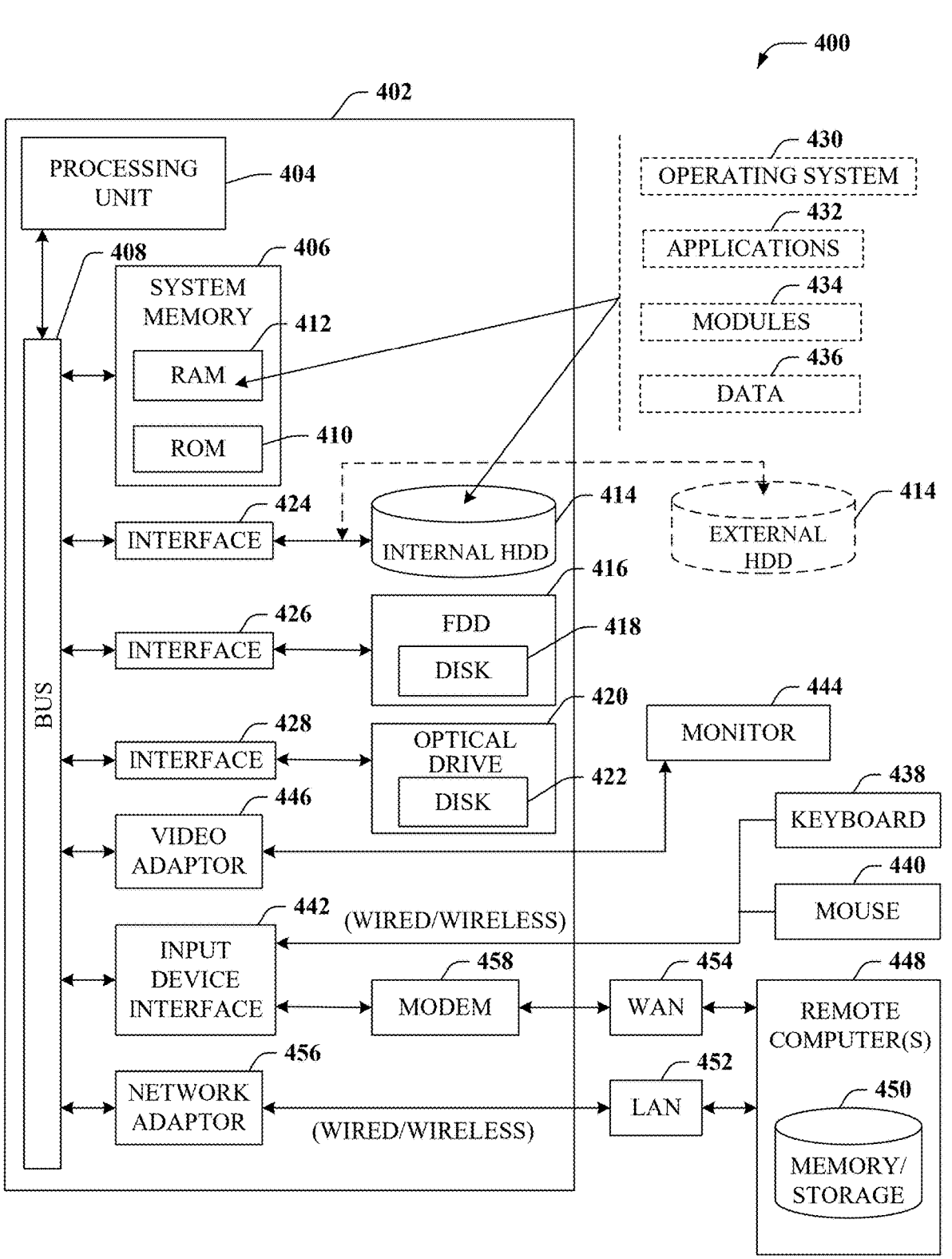
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, GenAI-based analysis of ticket data and/or document information.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
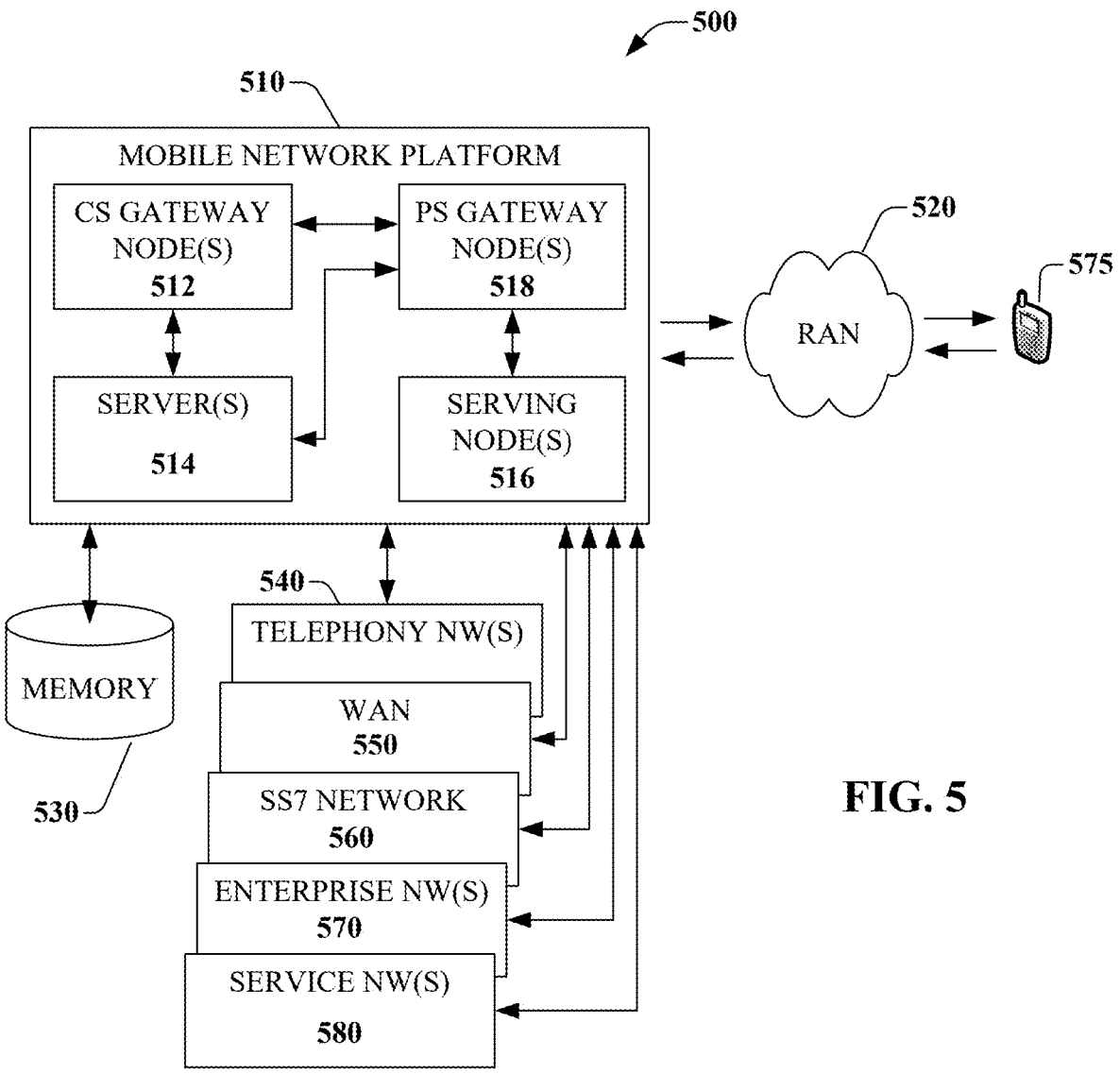
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, GenAI-based analysis of ticket data and/or document information. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
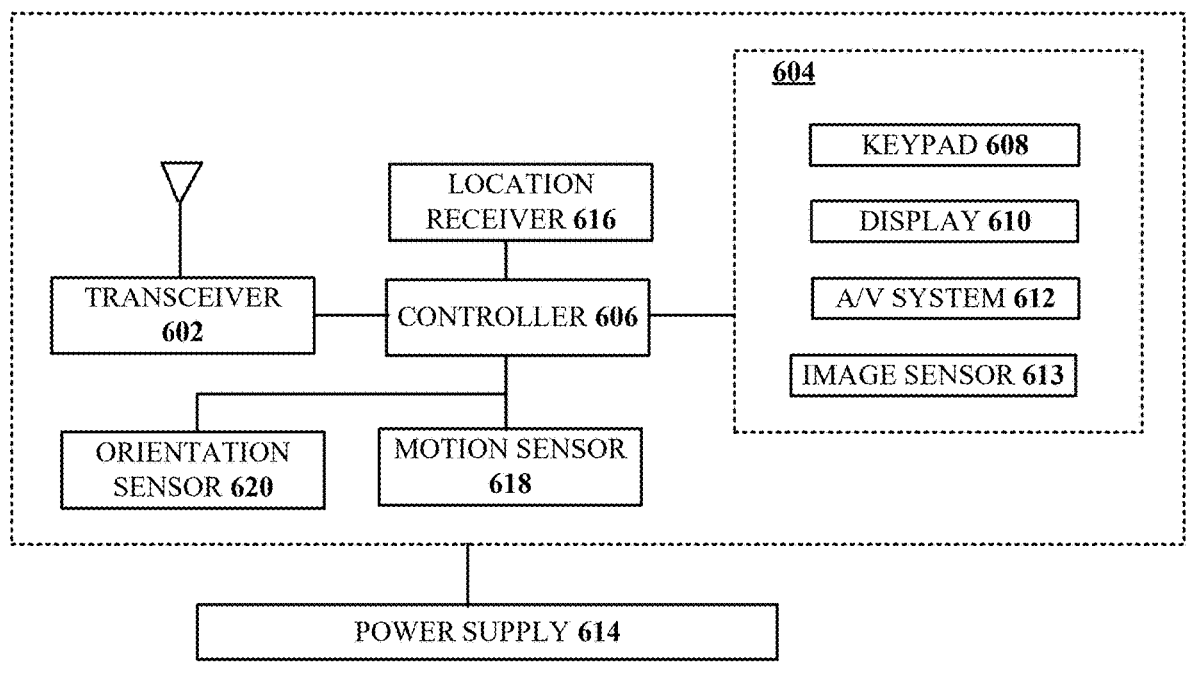
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, GenAI-based analysis of ticket data and/or document information.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $X=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving a user prompt relating to one or more tickets stored in a database;

transmitting the user prompt to a large language model (LLM) to derive a database access query;

after the transmitting, obtaining the database access query from the LLM;

modifying the database access query to prevent retrieval of restricted data based on user access level information, resulting in a modified database access query;

sending the modified database access query to a query service to retrieve ticket-related data from the database;

based on the sending, obtaining retrieved ticket-related data from the query service, wherein the restricted data is excluded from the retrieved ticket-related data; and causing the LLM to generate a response to the user prompt using the retrieved ticket-related data.

2. The device of claim 1, wherein the operations further comprise:

generating a command for updating a log file or an application executing on a user device.

3. The device of claim 2, wherein the operations further comprise:

causing the response and the command to be transmitted to the user device, wherein the command causes an automatic update of the log file or the application based on data in the response.

4. The device of claim 1, wherein the receiving comprises receiving the user prompt from a frontend system that is in communication with a user device.

5. The device of claim 1, wherein the user prompt comprises a natural language question or query.

6. The device of claim 1, wherein the database comprises a Structured Query Language (SQL) database.

7. The device of claim 6, wherein the database access query comprises an SQL query.

8. The device of claim 1, wherein the LLM has access to a prompt file that identifies a relational schema of the database.

9. The device of claim 1, wherein the LLM is trained on a prompt file that identifies a relational schema of the database.

10. The device of claim 1, wherein the operations further comprise causing a markup service to perform processing of the response into a user-readable format.

11. A non-transitory machine-readable medium, comprising executable instructions that, when executed by a processing system including a processor, facilitate performance of operations, the operations comprising:

receiving a user prompt relating to tickets stored in a Structured Query Language (SQL) database, wherein the user prompt comprises a natural language question;

providing the user prompt to an artificial intelligence (AI) model to derive an SQL query;

obtaining the SQL query from the AI model;

modifying the SQL query to prevent retrieval of restricted data based on user access level information, resulting in a modified SQL query;

forwarding the modified SQL query to a query service to retrieve ticket-related data from the SQL database;

based on the forwarding, obtaining retrieved ticket-related data from the query service, wherein the restricted data is excluded from the retrieved ticket-related data; and instructing the AI model to generate a response to the user prompt using the retrieved ticket-related data.

12. The non-transitory machine-readable medium of claim 11, wherein the AI model comprises a large language model (LLM).

13. The non-transitory machine-readable medium of claim 11, wherein the AI model has access to a prompt file that identifies a relational schema of the SQL database.

14. The non-transitory machine-readable medium of claim 11, wherein the AI model is trained on a prompt file that identifies a relational schema of the database.

15. The non-transitory machine-readable medium of claim 11, wherein the operations further comprise causing a markup service to perform processing of the response into a user-readable format.

16. A method, comprising:

receiving, by a processing system including a processor, a user prompt relating to trouble tickets stored in a database;

transmitting, by the processing system, the user prompt to a large language model (LLM) to derive a database access query, wherein the LLM has access to or is trained on a prompt file that identifies a relational schema of the database;

after the transmitting, obtaining, by the processing system, the database access query from the LLM;

modifying, by the processing system, the database access query to prevent retrieval of restricted data based on user access level information, resulting in a modified database access query;

sending, by the processing system, the modified database access query to a query service to retrieve ticket-related data from the database;

obtaining, by the processing system, retrieved ticket-related data from the query service, wherein the restricted data is excluded from the retrieved ticket-related data; and commanding, by the processing system, the LLM to prepare a response to the user prompt using the retrieved ticket-related data.

17. The method of claim 16, wherein the user prompt comprises a natural language question or query.

18. The method of claim 16, wherein the database comprises a Structured Query Language (SQL) database.

19. The method of claim 18, wherein the database access query comprises an SQL query.

20. The method of claim 16, wherein the receiving comprises receiving the user prompt from a frontend system that is in communication with a user device.

\* \* \* \* \*